J. JACOMIN.
FASTENER.
APPLICATION FILED SEPT. 10, 1908.
981,654.
Patented Jan. 17, 1911.
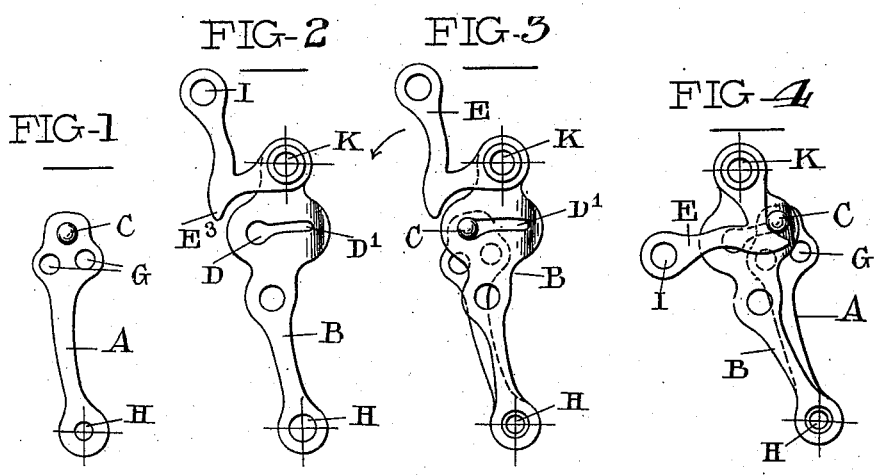
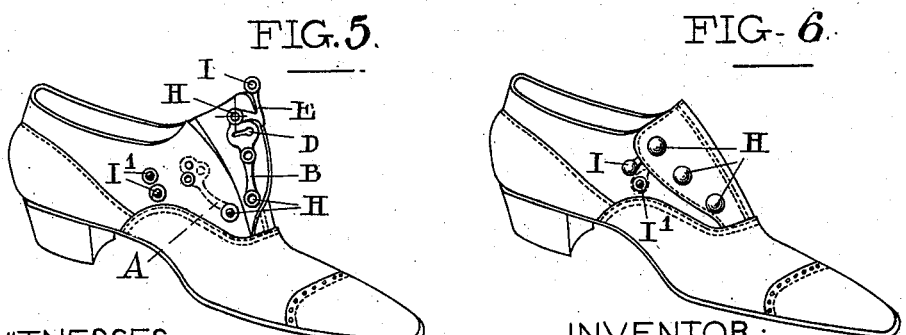
WITNESSES:
Jean Germain
Guillaume Pioche
INVENTOR:
Joseph Jacomin

UNITED STATES PATENT OFFICE.

JOSEPH JACOMIN, OF LYON, FRANCE.

FASTENER.

981,654.  Specification of Letters Patent.  Patented Jan. 17, 1911.

Application filed September 10, 1908. Serial No. 452,441.

*To all whom it may concern:*

Be it known that I, JOSEPH JACOMIN, a citizen of the French Republic, residing at Lyon, in France, have invented certain new and useful Improvements in Fasteners, of which the following is a specification.

This invention relates to a fastening device comprising two plates fixed, respectively, to the two parts which are to be connected to each other. One of these plates is provided with a stud adapted to engage a hole in the other plate, and the hole communicates with a slot in the same plate. The fastening is secured by means of a locking lever movable on one of said plates and adapted to retain the shank of the stud in the slots. The lever is adapted to be fixed in the closing position by means of spring stud members.

A construction embodying the invention as applied to a shoe is shown in the annexed drawings, in which—

Figures 1 and 2 are front views of plates which are fastened to each other by means of a hook pivoted in a socket used for fastening one of the plates to one of the parts to be joined together. Figs. 3 and 4 illustrate the manner in which these two plates are joined together, and Figs. 5 and 6 show this latter form of plates applied to a shoe, the fastening being open in Fig. 5 and closed in Fig. 6.

The fastener illustrated comprises two plates A and B sewn or fixed one to each of the parts of the article to be connected, the plate A being shown as provided with eyes G—G for this purpose. On the plate A is fixed a stud C and to the plate B is pivoted at K, a lever E provided with a nose $E^3$. The plate B is provided with a slot $D^1$ enlarged at one extremity as at D. The head of the stud C can traverse the opening D but cannot pass out through $D^1$. The outer end of the lever E is terminated by the female or socket member of an ordinary spring stud I.

To connect the two parts of the article the stud C is introduced into the opening D (as shown in Fig. 3) whereupon the lever E is moved to the position indicated in Fig. 4. During this movement the nose $E^3$ of lever E forces back the stud C to the end of the slot $D^1$. At this moment the socket I comes above the male part of a corresponding spring stud $I^1$ (Fig. 5). The two members I $I^1$ are then engaged and the fastening is secured. Owing to the engagement of the members I and $I^1$, the lever E is locked and consequently the stud is held at the end of the slot $D^1$ from which it cannot escape. This is the essential feature of the invention.

What I claim as my invention and desire to secure by Letters Patent of the United States is:—

A fastener comprising a plate attached to one part to be connected, a stud projecting from said plate, a second plate attachable to the other part to be connected and having an aperture with a communicating slot adapted to receive said stud, a pivotal locking lever mounted on said slotted plate, a nose on said lever adapted to abut against said stud and force the shank thereof into the slot and spring stud members carried by said locking lever and by the first mentioned part respectively for retaining said lever in its locking position.

In witness whereof I have signed this specification in the presence of two witnesses.

JOSEPH JACOMIN.

Witnesses:
JEAN GERMAIN,
GUILLAUME PIOCHE.